United States Patent [19]

Brown

[11] 4,150,187

[45] Apr. 17, 1979

[54] TRANSFER ELEMENTS AND PROCESS

[75] Inventor: Albert E. Brown, Glen Cove, N.Y.

[73] Assignee: Columbia Ribbon and Carbon Manufacturing Co., Inc., Glen Cove, N.Y.

[21] Appl. No.: 609,540

[22] Filed: Sep. 2, 1975

[51] Int. Cl.[2] ......................... B32B 3/00; B32B 27/04

[52] U.S. Cl. ................................. 428/144; 450/241.2; 427/152; 427/153; 427/203; 428/323; 428/511; 428/914

[58] Field of Search ............... 427/146, 203, 152, 153; 428/143, 144, 323, 339, 411, 511, 537, 914, 913; 282/27.5; 197/172

[56] References Cited

U.S. PATENT DOCUMENTS

| | | | |
|---|---|---|---|
| 2,655,453 | 10/1953 | Sandberg | 428/914 X |
| 3,328,190 | 6/1967 | Mathieu | 428/914 X |
| 3,413,184 | 11/1968 | Findlay et al. | 428/914 X |
| 3,689,301 | 9/1972 | Scott | 428/914 X |
| 3,904,803 | 9/1975 | Brown et al. | 428/320 |
| 3,930,099 | 12/1975 | Gregson | 428/315 |

*Primary Examiner*—Thomas J. Herbert, Jr.
*Assistant Examiner*—Bruce H. Hess
*Attorney, Agent, or Firm*—Thomas L. Tully

[57] ABSTRACT

Pressure-sensitive reusable transfer elements of the squeeze-out type having a microporous resinous ink-releasing layer firmly bonded to a flexible foundation. The invention is characterized by the use of a bonding layer which is applied to the foundation as an aqueous composition comprising a water-dispersible, water-insoluble resinous binder material which dries to form a tacky, adhesive layer.

6 Claims, No Drawings

TRANSFER ELEMENTS AND PROCESS

Reusable transfer elements of the squeeze-out type are well known in the carbon paper and ribbon field. Such transfer elements have a microporous skeletal resinous structure which is substantially non-transferable under the effects of imaging pressure but which contains an oily ink within the pores thereof which is transferable under such pressure. If the microporous resinous structure is not adequately bonded to its foundation, it will break down and fracture and transfer to the copy sheet in a spotty fashion so that the transfer element is no longer reusable to produce good uniform copy.

It is known according to U.S. Pat. No. 3,037,879 to provide a resinous bonding layer between a flexible foundation and a microporous reusable transfer layer, the latter being solvent-bonded to the bonding layer to prevent transfer of the microporous resinous structure during use. This is accomplished by applying the resinous ink layer using a volatile organic solvent which is a solvent for the resin of the bonding layer and dissolves the surface of the latter to permit integration with the microporous resinous structure of the ink layer.

It is known according to U.S. Pat. No. 3,314,814 to produce microporous resinous squeeze-out type ink layers from aqueous solvent system using film-forming materials such as polyvinyl alcohol which are soluble in water or mixtures of water and alcohol. Aqueous compositions tend to be repelled by resin surfaces such as plastic films and resin coated films and papers but the inclusion of aliphatic alcohol solvent improves the affinity of aqueous compositions for such surfaces. However the resulting bond is not as strong as a solvent bond and such transfer elements are not as resistant to breakdown on repeated reuse as desirable. Attempts to overcome this problem by the use of a bonding layer based upon a water-soluble binder material such as polyvinyl alcohol or a water-emulsifiable binder material such as polyvinyl acetate latex have not been successful. A polyvinyl alcohol bonding layer causes the flexible foundation, whether paper or plastic film, to curl and roll badly so that the resulting transfer elements are commercially unacceptable. A polyvinyl acetate bonding layer insolubilizes during drying and does not permit solvent-bonding to occur with the ink layer composition. These problems are overcome according to copending application, now U.S. Pat. No. 3,904,803, issued Sept. 9, 1975, by the use of bonding layers based upon a mixture of a water-soluble resinous binder material and a water-insoluble resinous binder material within a certain prescribed ratio. While such bonding layers provide excellent results, they do require the step of mixing the different binder materials in the required proportions. Furthermore since such bonding layers contain both water-soluble and organic solvent-soluble resinous materials, they are subject to attack by the solvent used to apply the ink layer thereover. Such solvent attack can result in a lack of uniformity of performance on the part of the transfer sheets and ribbons produced unless the amount of solvent present in the ink coating and the drying rate of the ink layer are closely controlled. Excessive solvent attack on the bonding layer causes softening thereof and retention of solvent therein which can cause the transfer element to curl on subsequent evaporation of the solvent.

It is the principal object of the present invention to provide a resinous bonding layer which is capable of being applied to a flexible foundation by means of an aqueous solvent without causing objectionable curling and which produces a cured, inert bonding layer which is adhesive to the touch and provides a strong bond with a microporous resinous ink layer, applied by means of an aqueous solvent.

It is another object of this invention to provide a water-base composition which can be applied to a flexible foundation to provide a cured, inert bonding layer which is adhesive to the touch and has excellent bonding properties for microporous ink layers applied from water vehicle while being inert to attack by said vehicles.

These and other objects and advantages of the present invention will be apparent to those skilled in the art in the light of the present disclosure.

The present invention is based upon the discovery that a non-transferable microporous ink layer may be sufficiently bonded to an inert bonding layer present on a flexible foundation to prevent mass transfer of said ink layer under the effects of imaging pressure provided that the inert bonding layer is one which has a tacky adhesive surface so as to have a physical affinity for the ink layer.

Non-transferable microporous ink layers provide reusable transfer elements in that the microporous resinous network remains bonded to its foundation while a portion of the ink present in the pores thereof is transferred to a copy sheet under the effects of imaging pressure. So long as the microporous resinous network remains bonded to its foundation, the transfer element can be reused many times. As mentioned supra, adequate bonding has been provided in the past by the use of a bonding layer which is soluble in the solvent used to apply the ink layer, permitting solvent-bonding to occur between the ink layer and the bonding layer. In the absence of such solvent-bonding, the microporous resinous network was not sufficiently anchored to the bonding layer to resist transfer to a copy sheet under the effects of imaging pressure.

However the novel bonding layers of the present invention have a physical affinity for microporous resinous ink layers, rather than a chemical affinity, and are inert to the volatile solvent or vehicle used to apply the ink layer thereover. Thus the solvent or vehicle has no softening effect upon the bonding layer, regardless of the amount of solvent or vehicle present or its dwell time in contact with the bonding layer prior to evaporation. This avoids the lack of uniformity of performance and the curling tendency as may be caused by excessive solvent attack upon the bonding layer.

The preferred compositions for use in producing the bonding layers of the present invention are based upon water-insoluble, water-dispersible, self-cross-linking acrylic polymers such as Ucar 152 which is commercially available from Union Carbide Company. Ucar 152 is a 58% solids aqueous dispersion of a water-insoluble, self-cross-linking acrylic polymer which cross-links during drying to form a sticky bonding layer which is inert to water and to organic solvents.

In the event that the transfer element is not produced in a continuous in-line operation, it is necessary to include in the bonding layer composition an amount of a particulate surface material such as starch, inert polymer shpheres, clay, glass beads or other inert solid materials which are uniformly dispersed throughout the bonding layer and extend above the surface thereof. In this manner the surface materials function as spacers which prevent the rear surface of the foundation from sticking to the bonding layer when the coated foundation is collected on a roll for subsequent application of the ink layer. The amount of surface material used depends upon the size and weight thereof but in general such materials are used in an amount of from about 1% up to about 15% based upon the solids content of the bonding layer composition.

The preferred surface materials are those which are larger in diameter than the thickness of the dried bonding layer so as to insure that the particles, evenly dispersed throughout the layer, project at least slightly above the surface of the bonding layer. Since the dried bonding layers of the present invention have a thickness of from about 0.25 point to 1 point (0.000025 inch to 0.0001 inch), preferably from about 0.5 point to 0.75 point, then the average particle size of the particulate surface materials used should be at least about 10% greater than the particular thickness of the binder layer in which they are incorporated.

It is also preferred to incorporate a small amount of a wetting agent in the present bonding layer compositions in cases where the foundation is a plastic film such as polyethylene terephthalate, polyethylene, polypropylene, nylon, cellulose acetate or other smooth film which does not have an affinity for aqueous compositions. In general, anionic wetting agents are preferred, within the range of from about 0.5% up to about 5%, based upon the solids content of the bonding layer composition.

The following example of a suitable bonding layer composition, according to the present invention, is given as illustrative and should not be considered limitative.

Example

| Ingredients | Percent by Weight |
|---|---|
| Acrylic polymer emulsion Ucar 152 (58% solids) | 47.5 |
| Starch particles | 2.0 |
| Anionic wetting agent | 0.5 |
| Water | 50.0 |

The ingredients are uniformly mixed to form a coating composition containing about 26% solids content. The composition is applied as a uniformly thin layer to a 0.5 mil polypropylene film foundation and is dried by evaporation of the water to form a bonding layer having a thickness of about 0.5 point (0.05 mil). The resinous acrylic polymer cross-links with itself and cures during drying to become sticky or adhesive to the touch. However the dispersed starch particles project above the surface of the cured acrylic polymer so that the coated film can be rolled up without causing the bonding coating to stick or adhere to any substantial or detrimental extent to the back, uncoated surface of the film foundation. In other words, the resinous portion of the bonding layer is sticky and adhesive to the touch in areas between projecting starch particles but the particles act as spacers which prevent other sheets or flat elements from contacting the adhesive resinous portion of the coating to a sufficient extent to permit bonding to occur.

In cases where the completed transfer element is being produced in a single, in-line coating operation, i.e., where the bonding layer is coated with the ink layer composition immediately after the former is dried and cured, it is not necessary to include in the bonding layer composition any starch or other particulate surface material. Thus, the composition of the present Example can be modified in this manner for in-line coating procedures.

The present undercoating compositions provide inert, curl-resistant, adhesive coatings having excellent bonding properties with respect to paper and plastic film foundations and also with respect to resinous squeeze-out type ink layers applied from a water vehicle.

Suitable water-base compositions for applying the resinous squeeze-out ink layer over the present inert, adhesive bonding layers of the present invention are those set forth in U.S. Pat. No. 3,314,814, particularly those comprising polyvinyl alcohol as the resinous binder material, incompatible oil and coloring matter.

Variations and modifications may be made within the scope of the claims and portions of the improvements may be used without others.

I claim:

1. Pressure-sensitive reusable transfer element comprising a flexible plastic film foundation, a bonding layer on said foundation and a water-applied microporous resinous ink layer adhered to said bonding layer, characterized by said bonding layer being sticky to the touch and insoluble in the water vehicle used to apply said ink layer thereto and comprising a self-cross-linked, cured water-insoluble acrylic polymer binder material.

2. Transfer element according to claim 1 in which said ink layer comprises a water-applied composition comprising polyvinyl alcohol as the resinous binder material.

3. Transfer element according to claim 1 in which said bonding layer also includes a minor amount of an inert, particulate surface material having an average particle size which is greater than the thickness of said bonding layer so as to project above the surface of said bonding layer.

4. Transfer element according to claim 1 in which said bonding layer has a thickness of from about 0.000025 inch to about 0.0001 inch.

5. Process for producing pressure-sensitive reusable transfer elements which comprises the steps of:

(a) coating a flexible plastic film foundation with a continuous uniform layer of an aqueous bonding composition comprising a water-insoluble, water-dispersible, self-cross-linking acrylic polymer binder material;

(b) drying said layer by evaporation of the water to cross-link said acrylic polymer and form a thin, sticky, cured adhesive bonding layer on said foundation;

(c) coating the surface of said bonding layer with a continuous uniform layer of ink coating composition comprising a film-forming binder material, an incompatible oil, coloring matter and a volatile aqueous vehicle which is a non-solvent for said bonding layer; and (d) drying said ink coating by evaporation of said volatile aqueous vehicle to form a microporous structure of said film-forming binder material which is firmly adhered to said sticky bonding layer and containing within the pores thereof said incompatible oil and coloring matter as a pressure-exudable ink.

6. Process according to claim 5 in which said bonding composition also comprises a minor amount by weight of an inert, particulate surface material having an average particle size greater than the thickness of the formed bonding layer so that the surface material projects above the surface of the sticky, adhesive bonding layer.

* * * * *